United States Patent [19]

Zeheb et al.

[11] Patent Number: 5,549,848
[45] Date of Patent: Aug. 27, 1996

[54] HIGH TEMPERATURE EVAPORATION INHIBITOR LIQUID

[75] Inventors: Ron Zeheb; Paula M. Rodgers, both of Tucson, Ariz.

[73] Assignee: Ventana Medical Systems, Inc., Tucson, Ariz.

[21] Appl. No.: 456,602

[22] Filed: Jun. 1, 1995

Related U.S. Application Data

[62] Division of Ser. No. 155,935, Nov. 15, 1993.

[51] Int. Cl.$^6$ ................................................ C09K 3/00
[52] U.S. Cl. ................ 252/408.1; 252/194; 436/18; 422/43
[58] Field of Search .................. 422/43, 42; 252/408.1, 252/194; 438/18

[56] References Cited

U.S. PATENT DOCUMENTS

| | | | |
|---|---|---|---|
| 3,095,263 | 6/1963 | Eckert | 422/43 |
| 3,147,067 | 9/1964 | Salyer | 422/43 |
| 3,199,944 | 8/1965 | Gabor et al. | 422/40 |
| 3,231,325 | 1/1966 | Oster | 422/43 |
| 3,391,987 | 7/1968 | Myers | 422/43 |
| 3,415,614 | 12/1968 | Egan | 422/43 |
| 3,431,063 | 3/1969 | Fox | 422/43 |
| 3,437,421 | 4/1969 | Harwood | 422/43 |
| 3,441,369 | 4/1969 | McCoy | 422/43 |
| 3,458,274 | 7/1969 | Cashman | 422/43 |
| 3,459,492 | 8/1969 | Cawley | 422/43 |
| 3,507,611 | 4/1970 | Boultinghouse | 422/43 |
| 3,528,764 | 9/1970 | Reiser | 422/43 |
| 3,531,239 | 9/1970 | Rowlette | 422/43 |
| 3,549,313 | 12/1970 | Eckert | 422/43 |
| 3,714,210 | 1/1973 | Schweiger et al. | 260/412.8 |
| 3,738,807 | 6/1973 | Horowitz et al. | 422/43 |
| 3,918,904 | 11/1975 | Vartiak | 422/43 |
| 3,969,087 | 7/1976 | Saito et al. | 44/7 |
| 4,099,915 | 7/1978 | Savoit et al. | 422/43 |
| 4,106,906 | 8/1978 | Moore et al. | 422/43 |
| 4,151,078 | 4/1979 | Calvin | 210/30 A |
| 4,162,990 | 7/1979 | Rowlette | 252/383 |
| 4,166,823 | 9/1979 | Sietz | 260/403 |
| 4,250,140 | 2/1981 | Rowlette | 422/43 |
| 4,440,115 | 4/1984 | Allen | 123/1 A |
| 4,502,975 | 3/1985 | Kobayashi et al. | 252/315 I |
| 4,728,340 | 3/1988 | Vos | 44/62 |
| 4,877,612 | 10/1989 | Berger et al. | 424/282.1 |
| 5,149,642 | 9/1992 | Mazur et al. | 435/135 |
| 5,225,325 | 7/1993 | Miller et al. | 435/6 |

FOREIGN PATENT DOCUMENTS

WO91/13336  9/1991  WIPO.

OTHER PUBLICATIONS

Rev, Inst. Fr. Petrole Ann. Combust. Liquides, vol. 23, No. 5, issued 1968, Thevenin et al., "Use of Monomolecular Films to Protect Natural Water", pp. 670–671, see Chem. Abstract 69:45923 only.

Indian Journal Technol., vol. 5, No. 5, issued 1967, Sushilendra, Katti et al. "Preparation of Saturated Long Chain Fatty Alcohols From Vegetable Oils for use as Water Evaporation Retardants", pp. 155–157. see Chem Ab. 67:83218 only.

Nature, vol. 212, Nov. 5, 1966, p. 602.

JP 47043744 B4, (Shinohara, Yoshiyuki et al.) 06 Nov. 1972, see Chem. Abstract 79:149275 only.

Hawley's Condensed Chemical Dictionary, 11th edition Sax et al., Van Nostrand Rheinhold Company, New York, New York, 1987, pp. 1233–1234.

Morrison et al. *Organic Chemistry*, Allyn and Bacon Inc., Boston, 1976, p. 87.

Morrision and Boyd, *Organic Chemistry* (4th ed.) 94. after 1987.

Primary Examiner—Sharon Gibson
Assistant Examiner—Valerie Fee
Attorney, Agent, or Firm—Skjerven, Morrill, MacPherson, Franklin & Friel; Laura Terlizzi; Emily M. Haliday

[57] ABSTRACT

The present invention provides a liquid evaporation inhibitor which is suitable for use in high temperature applications; e.g., above 70° C. The evaporation inhibitor liquid comprises a mixture of an alkane, a non-volatile oil, preferably a vegetable oil and a surfactant. The alkane is present in the mixture in an amount sufficient to provide a density which promotes floating on an aqueous medium and to cover an aqueous medium. The non-volatile oil is present in the mixture in an amount sufficient to inhibit evaporation of the mixture at temperatures above 70° C. The surfactant is present in the mixture in an amount sufficient to maximize the contact surface area between the evaporation inhibitor liquid and the aqueous medium.

21 Claims, No Drawings

HIGH TEMPERATURE EVAPORATION INHIBITOR LIQUID

This application is a division of application Ser. No. 08/155,935, filed Nov. 15, 1993, now pending.

FIELD OF THE INVENTION

This invention relates to an improved evaporation inhibitor liquid for use in high temperature applications.

BACKGROUND OF THE INVENTION

In immunohistochemistry or in situ hybridization reactions, evaporation of the reaction mixture on the slide during incubation periods must be prevented. This is particularly important where a reaction mixture has a small volume, especially when heat is used to control or enhance the reaction kinetics. If evaporation occurs, the concentration of reagents changes, and the tissue section can dry out. Either of those conditions can cause erroneous results.

Traditionally, evaporation is controlled by either placing the slide in a humidified chamber or placing a glass or plastic coverslip over the slide and sealing the sides of the coverslip. Both of those methods are time consuming and cumbersome, and neither can be easily adapted to automation. In addition, use of a coverslip presents a risk that the tissue section will be damaged or removed from the slide when the coverslip is removed.

An improved method described in International Application No. PCT/US91/01108 published Sep. 5, 1991 (Publication No. WO 91/13336) controlled evaporation by covering the aqueous reaction mixture with an evaporation inhibitor liquid which was immiscible in the aqueous phase and had a density less than the aqueous phase. In a preferred embodiment, the evaporation inhibitor liquid was a non-aromatic hydrocarbon having from 6 to 18 carbons, preferably pentadecane (mineral oil). The evaporation inhibitor liquid covered the surface of the reaction mixture, preventing evaporation of the reagents.

This method is applicable to situations in which the ambient temperatures are less than approximately 70° C. However, at temperatures of 70° C. and higher, evaporation of the protective layer of mineral oil results in the eventual loss of protection. This loss can be very rapid (less than 5 minutes) at 100° C. Since certain detection chemistries must be performed at these elevated temperatures (nominal 95° C., range 68° C. to 110° C.), a protective overlay resistant to evaporation at the operating temperatures and having other favorable properties needed to perform the required chemistries is desirable.

SUMMARY OF THE INVENTION

The present invention provides a liquid evaporation inhibitor which is suitable for use in high temperature applications; e.g., 70° C. to 110° C. The evaporation inhibitor liquid comprises a mixture of an alkane (straight-chain, branched-chain, cyclo- or mixtures thereof) and a non-volatile oil, and, in a preferred embodiment, a surfactant. The alkane is preferably a mineral oil or a wax having from 10 to 20 carbons. The non-volatile oil is preferably a silicone oil or, preferably a vegetable oil, most preferably canola oil. The alkane is present in the mixture in an amount sufficient to provide a density which allows the mixture to float on the surface of an aqueous medium. The non-volatile oil is present in the mixture in an amount sufficient to inhibit evaporation of the mixture at temperatures above 70° C. When present, the surfactant is present in the mixture in an amount sufficient to maximize the contact surface area between the evaporation inhibitor liquid and an aqueous medium.

DESCRIPTION OF THE INVENTION

The present invention provides a liquid evaporation inhibitor for use in high temperature applications. The evaporation inhibitor liquid comprises a mixture of an alkane and a non-volatile oil. The alkane is present in the mixture in an amount sufficient to provide a density which is sufficiently lower than the density of water to facilitate floating the mixture on the surface of an aqueous medium. The non-volatile oil is present in the mixture in an amount sufficient to inhibit evaporation of the mixture at elevated temperatures. In a preferred embodiment, a surfactant is present in the mixture in an amount sufficient to maximize the contact surface area between the evaporation inhibitor liquid and an aqueous medium.

The evaporation inhibitor liquid is useful for assays performed on a slide where a small volume of reagents are maintained at an elevated temperature (above room temperature). The evaporation inhibitor liquid is particularly useful where the concentration of the reagents is important and the process is performed at high temperatures such as, for example, in situ hybridization procedures and heat-based antigen unmasking procedures. However, the evaporation inhibitor liquid is also suitable for use in assays performed at 20° to 70° C. where reagent concentration is important such as ELISA assays, immunohistochemical applications, and in situ hybridization applications which are performed at intermediate temperatures (e.g., detection of RNA targets).

The evaporation inhibitor liquid has the following characteristics. The liquid does not interfere with the reactions which take place in the aqueous phase. The evaporation inhibitor liquid has a boiling point which is significantly higher than the temperature at which the reactions are run. Preferably, the evaporation inhibitor liquid has a boiling point above 150° C., more preferably above 200° C. Preferably, the evaporation inhibitor liquid has a low viscosity for ease of application.

The Alkane

As used herein, the term "alkane" refers to a class of aliphatic hydrocarbons characterized by a straight chain (having a generic formula $C_nH_{2n+2}$, an n-paraffinic hydrocarbon) or branched-chain or cyclic carbon chain each having from 1 to greater than 50 carbons. Alkanes which are useful in this invention have at least about 6 carbons. Preferred straight chain alkanes include the C6 to C17 hydrocarbons commonly referred to as mineral oils and the C18 to C20 hydrocarbons which are solid at room temperature and are commonly referred to as waxes. More preferred straight chain alkanes are medium chain alkanes having from 10 (decane) to 20 (icosane) carbons, preferably the wax octadecane (C18). Preferred alkanes can have more than 20 carbons when the alkane is branched or cyclic. Mixtures of alkanes are also contemplated. A most preferred alkane is a mixture of C15 to C20 alkanes having approximately ⅔ branched-chain alkanes and ⅓ cycloalkanes and available commercially under the trade name ISOPAR V (CAS# 64742-46-7;Exxon Chemical Americas, Houston, Tex.).

These alkanes have the following properties which are useful to prevent evaporation in immunohistochemistry and in situ hybridization reactions. The alkanes are practically inert and immiscible in the aqueous reaction mixtures used in immunohistochemistry and in situ hybridization. Thus, the alkanes do not interfere with the chemical reaction in the aqueous phase. The alkanes have densities significantly less than that of water, ranging from 0.73 to 0.86, allowing them to easily float on the aqueous phase. The alkanes have boiling points well above the range of temperatures needed for immunohistochemical or in situ hybridization, which boiling points range from 174° C. to 320° C.

In addition to the required characteristics, all of these alkanes have additional properties which are desirable for use in such reactions. The liquid alkanes have melting points below room temperature, making them easy to dispense. The alkanes also have relatively low viscosities which facilitate easy dispensing. The waxes are used by heating the wax until it melts then mixing with the oil. The resulting mixture (tested at up to 40% wax by weight) remains liquid at room temperature with suitable viscosity. The alkanes are also inexpensive and available in high purity.

However, when used alone, the alkanes smoke at temperatures of 90° C. or above. The smoking indicates that the protective layer of alkane evaporates at elevated temperatures, resulting in the eventual loss of protection.

The Non-volatile Oil

As used herein, the term "non-volatile oil" is used to refer to oils which can be heated to the boiling point of water without significant evaporation (e.g., less than 1% loss over a 30 minute period at 100° C.). The non-volatile oils include silicone oils, vegetable oils, and other oils having similar properties, which properties are discussed in detail hereinafter and illustrated in Table 1. Most preferred are the vegetable oils.

As used herein, the term "vegetable oil" is used in its everyday sense and refers to the oil of any plant whether the oil is derived from a vegetable or a fruit. The vegetable oil is preferably a refined, edible oil and can be derived from, for example, rapeseed (Canola), soybean, safflower, sunflower, corn, cottonseed-and olive. However, any vegetable oil which provides the properties described hereinafter is suitable. More preferably the vegetable oil is one that is suitable for deep frying applications. Most preferred is low erucic acid Canola oil due to its excellent resistance to oxidation and its resistance to thermal breakdown.

As stated above, suitable non-volatile oils must be able to be heated to the boiling point of water without significant evaporation. Preferably, the non-volatile oil loses less than 1% of its starting weight to evaporation when heated to 100° C. for 30 minutes. The non-volatile oil preferably has a boiling point in excess of 200° C. The non-volatile oil is capable of forming a uniform mixture with the alkane.

A preferred non-volatile oil having these properties is silicone oil. Silicone oils are commercially available from a number of sources including from Sigma Chemical Company, Saint Louis, Mo. (Product No.: M6884, CAS No.: 8020-83-5).

A more preferred non-volatile oil is a vegetable oil or a mixture of vegetable oils. Characteristics of non-volatile oils which make them suitable for use in the evaporation inhibitor liquid mixture are listed below in Table 1. With the exception of the density and viscosity of the oil, the silicone oils have the same characteristics.

TABLE 1

| Property | Suitable Range | Preferred Range |
|---|---|---|
| Flash Point | 250–350° C. | >300° C. |
| Smoke Point | 175–250° C. | >225° C. |
| Density | 0.89–0.96 g/ml | <0.92 g/ml |
| Viscosity | 15–19 centipoises | <17 centipoises |
| Water Solubility | insoluble | insoluble |
| Ability to Cover Aqueous Media | partial-complete | complete |
| Solubility in Alkane | partial-soluble | soluble |

Preferred vegetable oils have a high concentration of tocopherol or another suitable antioxidant to prevent breakdown of the oil at high temperatures. However, the actual chemical composition of the vegetable oil is not of particular importance so long as the necessary physical properties are provided by the composition. A further benefit of the vegetable oils is that they are almost totally safe (nontoxic) thus eliminating issues that might be factors with other compounds having similar physical properties. The vegetable oils are also readily available in large quantity and are relatively inexpensive. The approximate chemical composition of preferred vegetable oils is described in Table 2.

TABLE 2

| Fatty acids (as triglycerides) | Percent (range) |
|---|---|
| 16:0 | 3 (1–12) |
| 18:0 | 1 (0.5–6) |
| 18:1 | 60 (10–70) |
| 18:2 n-6 | 20 (10–70) |
| 18:3 n-3 | 13 (0.5–15) |
| 20:0 | 1 (0.5–10) |
| 20:1 | 1 (0.5–10) |
| 22:0 | <1 (<1–5) |
| 22:1 | <1 (<1–50) |
| Sterols | 0.5 (0–4) |
| | mg/kq (range) |
| Tocopherols | 873 (50–1,500) |

The Surfactant

As stated previously, the mixture preferably contains a surfactant. Other terms used to describe surfactants include, for example, wetting agents, detergents, solubilizers and soaps. The properties of the surfactant are in part influenced by the overall balance between the hydrophilic portion of the molecule and the lipophilic portion of the molecule which can be described in terms of an overall numerical value called the HLB number which serve as a guide to the behavior of surfactants in aqueous or oil solutions. Surfactants with HLB values greater than 10 are predominantly hydrophilic, those with values below 10 (but above zero) are predominantly lipophilic.

For this invention, a surfactant with properties consistent with an intermediate HLB value, preferably with an HLB value between approximately 5 and 15, are preferred. However, any surfactant producing the desired effect of partitioning at the aqueous/oil interface is suitable for the purposes of this invention.

The surfactant should be compatible with reagents for in situ hybridization, immunohistochemical staining reagents, and immunochemical reagents in general and can be any of the nonionic biological detergents used by biochemists for the solubilization of proteins and membrane components. Polyoxyethylenesorbitans and polyoxyethylene ethers are preferred. More preferred are the surfactants sold under the tradename BRIJ. Most preferred is polyoxyethylene 10 oleyl ether (sold under the tradename BRIJ 96, CAS# 9004-98-2, Sigma Chemical Company, St. Louis, Mo.) which has an HLB value of approximately 12.4.

The Mixture

The evaporation inhibitor liquid is a mixture of an alkane, a non-volatile oil and, preferably, a surfactant. The alkane is present in the mixture in an amount sufficient to provide a density which inhibits mixing with an aqueous medium upon agitation and to cover an aqueous medium. The non-volatile oil is present in the mixture in an amount sufficient to inhibit evaporation of the mixture at elevated temperatures. Inhibiting evaporation of the mixture at elevated temperatures means that the non-volatile oil is present at a concentration sufficient so that not more than 35%, preferably, not more than 25%, of the mixture evaporates after 30 minutes at 95° C. (For the conditions for this determination, see Example 5.)

When used alone as an evaporation inhibitor liquid, alkane has the disadvantage that it smokes and evaporates at elevated temperatures. The problems with evaporation are present at temperatures of greater than 70° C. but are more problematic at temperatures of 90° C. or above. Smoking is a visible sign of the evaporative loss of the oil. It does not indicate that the oil burns. The non-volatile oil greatly reduces any visible smoke at operating temperatures of 20° C. to 100° C. At high temperatures, the non-volatile oil extends the useful time during which the evaporation inhibitor liquid forms a continuous, unbroken layer over the aqueous medium.

When used alone, non-volatile oils tend to form small holes in the film over an aqueous medium. In addition, non-volatile oils have a relatively high density (about 0.92 to 0.96 g/ml) which is sufficiently close to the density of an aqueous medium that the oil impedes the further addition of aqueous reagents to a slide which already contains an aqueous medium covered by the nonvolatile oil. Furthermore, non-volatile oils have a viscosity (about 15 to about 19 centipoises for the vegetable oils and about 175–225 centipoises for the silicone oils at 25° C.) which makes application of the oil more cumbersome.

When used in appropriate proportions, the alkane lowers the density of the non-volatile oil, providing the mixture with a density that promotes an even spreading of the evaporation inhibitor liquid over the aqueous layer. Furthermore, the addition of alkane facilitates the subsequent application of additional aqueous media to the tissue section through the evaporation inhibitor liquid. The alkane also reduces the viscosity of the mixture and in so doing improves the ease of application. The non-volatile oil provides the mixture with the ability to withstand evaporation at temperatures above 70° C. and up to 100° or 110° C. In summary, the contribution of the alkane to the non-volatile oil is a reduction in overall viscosity, a reduction in overall density, and an enhanced ability of the mixture to spread over an aqueous medium as compared to a non-volatile oil that does not have added alkane.

Another property of the mixture is the propensity for the overlay to force a spreading of the underlying aqueous media so as to greatly increase the surface area:volume ratio of the aqueous media. This effect is enhanced by the presence of the surfactant additive. This property is useful because, like the traditional technique of placing a glass coverslip over the slide, the evaporation inhibitor liquid protects the aqueous media from evaporation and forces (by the action of the surfactant) a very small amount of aqueous media to cover a large surface area of the slide. This can result in a significant savings due to the cost of the aqueous reagent.

Preferably, the alkane and non-volatile oil are mixed together in proportions ranging from 80% (v/v) alkane to 80% (v/v) non-volatile oil. Such mixtures range in density from about 0.80 to about 0.89 g/ml. Preferably, the mixture comprises from about 30% to about 70% of the alkane, more preferably from about 40% to about 60% of the alkane. Most preferred is a mixture of substantially equal volume of the alkane and the non-volatile oil (i.e; 1:1 alkane:non-volatile oil) having a density of approximately 0.87 g/ml at 25° C.

When used, the surfactant is present in the mixture in an amount sufficient to maximize the contact surface area between the evaporation inhibitor liquid and the aqueous medium. The surfactant promotes this by virtue of having two domains within the single surfactant molecule. One domain is hydrophilic and therefore partitions into the aqueous medium. The other domain is lipophilic and therefore partitions into the evaporation inhibitor liquid. The result is that each surfactant molec♦cules simultaneously attracted to both the evaporation inhibitor fluid and the underlying aqueous layer. This chemical attraction forces the two liquids into close contact and the two liquids. This effect enhances the formation of a smooth, unbroken layer of protection over the entire aqueous medium and forces a spreading of the aqueous media into a thin film having a large surface area. Preferably, the surfactant is present at from 0.01 to 3.0 wt %. More preferably, the surfactant is present at from 0.05 to 0.5 wt %. In a most preferred embodiment, the surfactant is present in the mixture at 0.1 wt % (0.1 g added to 100 ml of the alkane/non-volatile oil mixture).

The mixture of the two oil types, in proper proportions, confers favorable properties on the mixture including resistance to evaporation at the desired elevated temperatures, low density, and good surface characteristics which allow the creation of a uniform, unbroken layer of protective oil covering the aqueous layer. These favorable properties are maintained over a very wide temperature range so that this new mixture can be used at low (e.g., 20° to 40° C.) and intermediate (e.g., 41° to 69° C.) as well as elevated temperatures (e.g., 70° to 100° C.). With added surfactant, the mixtures has improved surface characteristics.

Preparation of the Evaporation Inhibitor Liquid

The evaporation inhibitor liquid is prepared by mixing appropriate proportions of the alkane and the non-volatile oil. If present in the mixture, the appropriate amount of surfactant is then added and mixing is continued until the surfactant is fully dissolved in the alkane/non-volatile oil mixture. Following mixing, the evaporation inhibitor liquid can be stored at room temperature in either clear or opaque glass or plastic bottles.

Use of the Evaporation Inhibitor Liquid

The evaporation inhibitor liquid is used by dispensing a sufficient amount of the liquid, to cover the aqueous medium or tissue section, onto the slide or other assay surface. Use of about 800 μl is convenient for in situ applications. For immunohistochemical staining applications, volumes of 500–800 μl or less may be sufficient to conveniently cover the aqueous reagents over the tissue section. However, for applications requiring an aqueous medium of a volume larger than about 300 μl, use of 1000 μl or more may be required to cover the surface. In general, one cannot use too much of the evaporation inhibitor liquid. However, sufficient evaporation inhibitor liquid has been applied if the tissue section and reagents are covered.

Using an evaporation inhibitor liquid is more efficient and convenient than prior art methods using glass or plastic coverslips or humidified chambers. The evaporation inhibitor liquid is easily floated over the aqueous phase by simply applying a few drops of the liquid to the slide. The evaporation inhibitor liquid is also readily removed by washing the slide with a small amount of water. In addition, because of the dynamic nature of the evaporation inhibitor liquid phase, the aqueous phase reagents can be added in any sequence, as the aqueous phase sinks through the evaporation inhibitor liquid phase, ensuring that no evaporation takes place prior to addition of the coverslip or placement in the chamber as in prior art methods.

The aqueous phase can be mixed with the evaporation inhibitor liquid in place. The aqueous phase can be mixed by placing the slide on a conventional agitator. A preferred automated apparatus sold commercially under the name VENTANA 320 (Ventana Medical Systems, Inc., Tucson Ariz.) mixes the aqueous phase by directing air jets onto the slide. The evaporation inhibitor liquid effectively retains the aqueous phase reagents in place on the slide during mixing.

It should be noted that for in situ hybridization reactions the DNA is typically denatured at about 95° C. The evaporation inhibitor liquid is completely effective at 95° C. Humidity chambers used in prior art reactions to prevent evaporation are not effective since the vapor pressure inside the typical chamber is not high enough to prevent evaporation.

This invention is further illustrated by the following specific but non-limiting examples. Procedures which are constructively reduced to practice are described in the present tense, and procedures which have been carried out in the laboratory are set forth in the past tense.

EXAMPLE 1

Preparation of Evaporation Inhibitor Liquid

In a preferred embodiment of the invention, an evaporation inhibitor liquid of this invention was prepared as described below.

50 milliliters of a preferred alkane, ISOPAR V oil (CAS# 64742-46-7; Exxon Chemical Americas, Houston, Tex.), was mixed with 50 ml of a preferred non-volatile oil, canola oil (CAS# 8002-13-9; Hunt-Wesson, Inc., Fullerton, Calif.). The preparation was stored at room temperature in brown high density polyethylene bottles.

EXAMPLE 2

Preparation of Evaporation Inhibitor Liquid

In another preferred embodiment of the invention, an evaporation inhibitor liquid of this invention was prepared as described below.

A mixture of ISOPAR V oil and canola oil was prepared as described in Example 1. Following mixing, 0.1 grams of the surfactant polyoxyethylene 10 oleyl ether (CAS#9004-98-2, sold under the tradename BRIJ 96; Sigma Chemical Company, St. Louis, Mo.) was added to the alkane/non-volatile oil mixture and mixing was continued at room temperature until all of the surfactant was fully dissolved (about 10 minutes). The preparation was stored at room temperature in brown high density polyethylene bottles.

EXAMPLE 3

In Situ Hybridization Assay

The evaporation inhibitor liquid was prepared as described in Example 1.

The following procedure was performed as described below to detect human papilloma virus in formalin-fixed paraffin-embedded tissue sections of human cervical biopsies.

1. Bake slides to 58+/−2° C. for approximately 17 hours, then cool to room temperature.
2. Deparaffinize tissue sections in two changes of xylene for 5 minutes, each.
3. Wash sections in 2 changes of absolute ethanol for 5 minutes, each.
4. Air-dry sections (approximately 5–10 minutes).
5. Dispense 200 µl of digestion solution (50% Propylene Glycol; 0.025 M Tris/HCl, pH 7.4; 0.3 mM Sodium Metabisulfite; 5 mM Calcium Chloride; 0.05% Thimerosal; 0.025 u/ml type VIII alkaline protease) onto each slide.
6. Dispense 600 µl of evaporation inhibitor liquid onto each slide.
7. Raise slide temperature to 37° C. and incubate for 15 minutes.
8. Remove digestion solution and evaporation inhibitor liquid from each slide.
9. Add 200 µl 1X SSC (150 mM sodium chloride, 15 mM sodium citrate) and 600 µl evaporation inhibitor liquid onto each slide and incubate for 4 minutes at 37° C.
10. Remove liquid from the slides.
11. Repeat steps #9 and #10 three times.
12. Dispense 200 µl pre-hybridization solution [For a 5.0 ml solution use: 2.5 ml of Formamide (Sigma #7508), 1.5 ml of 25% dextran sulfate (Sigma #D-8906), 0.5 ml 20X SSC, 0.5 ml PBS] and 600 µl of evaporation inhibitor liquid, incubate 4 minutes at 37° C.
13. Remove liquid from the slides.
14. Repeat steps #12 and #13.
15. Dispense 100 µl of probe solution (HPV OmniProbe Set, Digene Diagnostics, Inc., Catalog No. 4206-1032) and 600 µl of evaporation inhibitor liquid per slide.
16. Raise slide temperature to 95° C., maintain temperature for 5 minutes.
17. Reduce slide temperature to 37° C., maintain temperature for 2 hours.
18. Remove liquid from the slides.
19. Dispense 800 µl of Wash Solution #2 (1X SSC, 2% w/v bovine serum albumin (BSA), 0.05% PROCLIN-300 antibiotic (Supelco, Cat. No. 4-8127, pH 7), prewarmed to 37° C. Incubate for 4 minutes.
20. Remove liquid from the slides.
21. Repeat steps #19 and #20 four times.
22. Dispense 200 µl of detection reagent [0.5 M Trizma base, 0.3 % (w/v) goat globulins (Sigma Chemical Co., Catalog No. G5640) 0.05% (v/v) PROCLIN-300 antibiotic, 0.014% (w/v) $ZnCl_2$, 0.125% (v/v) Streptavidin-alkaline phosphatase (TAGO Catalog No. 6567)] and 600 µl of evaporation inhibitor liquid per slide.
23. Incubate slides at 37° C. for 30 minutes.
24. Remove liquid from the slides.
25. Dispense 800 µl of substrate buffer (100 mM Tris, 100 mM NaCl, 50 mM $MgCl_2$, pH 9.5). Incubate for 4 minutes at 37° C.
26. Remove liquid from the slides.
27. Repeat steps #25 and #26 three times.

28. Dispense 200 μl of substrate solution [40 ml of substrate buffer containing 0.1 ml, each, of substrate 1 (5-bromo-4-chloro-3-indolylphosphate dye in dimethylformamide solution) and substrate 2 (nitroblue tetrazolium dye in dimethylformamide solution; Digene Kit Cat. No. 4206-0100) and 600 μl of evaporation inhibitor liquid per slide.
29. Incubate, at 37° C. for 30 minutes.
30. Remove from heat and remove liquid from the slides.
31. Dispense 800 μl of wash buffer, incubate for 4 minutes at 37° C.
32. Remove liquid from the slides.
33. Repeat steps and 32 three times.
34. Dispense 200 μl of counterstain (Nuclear Fast Red Stain) and 600 μl of evaporation inhibitor liquid.
35. Incubate for 1 minute.
36. Remove liquid from slides.
37. Dispense 800 μl of wash solution, incubate for 4 minutes.
38. Remove liquid from slides.
39. Repeat steps #37 and #38 three times.
40. Immerse slides in container of wash buffer (100 mM Trizma base, containing 0.05% PROCLIN-300 antibiotic).
41. Dehydrate sections in 95% ethanol for 1 minute followed by absolute ethanol for 1 minute.
42. Clear sections with xylene for 1 minute.
43. Mount sections with permanent mounting medium and view results with a light microscope.

EXAMPLE 4

RNA In Situ Hybridization Assay

The evaporation inhibitor liquid was prepared as described in Example 2.

The following procedure was performed as described below to detect Epstein-Barr Virus (EBV) encoded RNAs (EBER-2) in a formalin-fixed, paraffin-embedded tissue section of a human B-cell lymphoma which was grown in a SCID (severe combined immunodeficiency syndrome) mouse.

1. Slides were baked in an oven at 58 +/−2° C. for at least 1 hour, then allowed to cool to room temperature.
2. The slides were deparaffinized in two changes of xylene for 5 minutes, each, then washed in 2 changes of absolute ethanol for 5 minutes, each.
3. The slides were air-dried (approximately 5–10 minutes).
4. Sections were wet with 500 82 l of 1X SSC (150 mM NaCl, 15 mM sodium citrate, pH 7.0), after which the excess SSC was removed by gently tapping the edge of each slide on an absorbent paper towel.
5. 400 μl of digestion reagent [0.1 M Trizma base, 5 mM EDTA, pH 7.5, containing 2 μg/ml Proteinase K (Stratagene Catalog No. 300140)] and 800 μl of evaporation inhibitor liquid was applied to each slide, and the slides were warmed to 40° C. for 5 minutes.
6. Slides were washed 3 times with approximately 3.0 ml of 1X SSC, per wash.
7. Liquid was removed by gently tapping the edge of each slide on an absorbent paper towel.
8. 200 μl of prehybridization solution (For 10.0 ml: 2.5 ml formamide, 2.0 ml 20X SSC, 0.5 ml of 1 M sodium phosphate, 0.5 ml of 200 mM EDTA, 3.33 ml of 30% dextran sulfate, 0.52 ml of sterile deionized water, 0.1 ml of 100 μg/ml salmon sperm DNA, 1.0 ml of 50X Denhardt's solution [50X Denhardt's is made by adding 5 g of ficoll, 5 g of polyvinylpyrrolidone and 5 g of BSA to 500 ml of deionized water and mixing until dissolved]) was added to each slide and the slides incubated for 4 minutes at 40° C.
9. Liquid was removed as in #7, above.
10. 200 μl of hybridization solution (pre-hybridization solution to which is added a digoxigenin-labeled single stranded EBER-2 specific oligonucleotide to a final concentration of 1 μg/ml) and 800 μl of evaporation inhibitor liquid was added to each slide and the slides warmed up to 75° C. for 5 minutes.
11. The slides were brought to 40° C. and incubated for 15 minutes.
12. Liquid was removed as in #7, above.
13. 400 μl of Buffer #2 (Boehringer Mannheim, Cat. No. 1175-041) was added to each slide and the slides incubated for 4 minutes at 40° C.
14. Liquid was removed as in #7, above.
15. 400 μl of detection reagent (Buffer #2 containing 0.33% anti-digoxigenin alkaline phosphatase [Boehringer Mannheim, Cat. No. 1175-041]) and 800 μl of evaporation inhibitor liquid was added to each slide and the slides incubated for 15 minutes at 40° C.
16. Liquid was removed as in #7, above.
17. Slides were washed 3 times with approximately 3.0 ml of 1X SSC per wash. After the last application of 1X SSC, 800 μl of evaporation inhibitor liquid was applied to each slide and the slides incubated for 4 minutes at 40° C.
18. Step #17, above, was repeated.
19. Liquid was removed as in #7, above.
20. 400 μl of Buffer #3 (Boehringer Mannhelm, Cat. No. 1175-041) and 800 μl of evaporation inhibitor liquid was added to each slide and the slides were incubated at 40° C. for 4 minutes.
21. Liquid was removed as in #7, above.
22. 400 μl of substrate solution (Buffer #3 containing 35 μl of X-phosphate and 45 μl of NBT [Boehringer Mannheim, Cat. No. 1175-041]) and 800 μl of evaporation inhibitor liquid was added to each slide and the slides incubated at 40° C. for 30 minutes.
23. Liquid was removed as in #7, above.
24. Slides were washed as in #17, above.
25. Slides were washed as in #6, above.
26. Slides were dehydrated in 95% ethanol for 1 minute followed by absolute ethanol for 1 minute.
27. Sections were cleared by immersion of the slides in xylene for 1 minute.
28. Sections were mounted with permanent mounting medium and viewed with a light microscope.

EXAMPLE 5

Evaporation Study

This study demonstrates the improvement provided by using a mixture of an alkane with a non-volatile oil in comparison to use of either alone.

500 μl of a preferred non-volatile oil, canola oil, or an alkane, pentadecane or a mixture of the oil and the alkane (canola:pentadecane 1:1) was placed on a pre-weighed standard glass microscope slide. Slides were then reweighed and the starting weight of the oil determined by subtracting the slide weight from the total weight. Slides were then placed on a hot plate which had been preequilibrated to the indicated temperature. Slides were left on the hot plate at the indicated temperature for 30 minutes, then removed, allowed to cool to room temperature, and reweighed. The amount of oil remaining was determined by subtracting the slide pre-weight from the total weight after heating. Percent loss was calculated by comparing the starting oil weight with the weight remaining after heating. All tests were performed in triplicate and the data is expressed as the average percent loss by weight +/− standard deviation. The loss of oil (in percentage by weight) is shown below in Table 3.

TABLE 3

| Temperature (°C.) | SAMPLE | | |
| --- | --- | --- | --- |
| | Pentadecane | Canola Oil | Mixture |
| 40 | 1.9 ± .9 | 0.1 ± .1 | 1.4 ± .4 |
| 60 | 7.7 ± 1 | 0.4 ± .1 | 3.3 ± .5 |
| 80 | 25.4 ± 5 | 0.7 ± .2 | 7.9 ± .6 |
| 100 | 50.6 ± 6 | 0.4 ± .1 | 25.7 ± .7 |
| 110 | 83 ± 9 | 0.1 ± 0 | 32 ± 2 |

As shown in Table 3, the addition of a non-volatile oil to the alkane significantly reduces evaporation of the mixture at elevated temperatures.

EXAMPLE 6

Use of a Surfactant

An evaporation inhibitor liquid was prepared as described in Example 1. When the evaporation inhibitor liquid (500 μl) was applied to an aqueous medium (100 of 1X SSC) on a slide, the aqueous medium contracted upon itself forming a small round ball-like droplet surrounded on all sides (except the bottom where the droplet contacts the slide) by the evaporation inhibitor liquid. The aqueous medium was protected from evaporation. However this tendency to form a ball-like structure caused a fixed amount of the aqueous medium to cover only a small amount of tissue.

0.1 grams of the surfactant polyoxyethylene 10 oleyl ether (CAS# 9004-98-2, sold under the tradename BRIJ 96; Sigma Chemical Company, St. Louis, Mo.) was added to the evaporation inhibitor liquid prepared as described in Example 1. The surfactant-containing mixture was applied to the aqueous medium as described above. When using the surfactant-containing mixture, the aqueous medium reacted very differently. Instead of balling up, the aqueous medium flattened out into a thin flat, pancake-like appearance. This is highly desirable in that it permits a fixed amount of aqueous medium to cover a much larger area of tissue while still being fully protected by the evaporation inhibitor liquid.

What is claimed is:

1. A method for inhibiting evaporation of an aqueous medium comprising covering the aqueous medium with an evaporation inhibitor liquid comprising a mixture of an alkane having at least six carbons and a non-volatile oil, said alkane being present in said mixture in an amount sufficient to provide a density which facilitates floating the mixture on the surface of an aqueous medium, said non-volatile oil being present in said mixture in an amount sufficient to inhibit evaporation of said mixture at elevated temperatures.

2. The method of claim 1 wherein said alkane has from 10 to 20 carbons.

3. The method of claim 1 wherein said alkane is octadecane.

4. The method of claim 1 wherein said alkane is mixture of alkanes having from 15 to 20 carbons.

5. The method of claim 4 wherein said mixture of alkanes is comprised of branched-chain alkanes and cycloalkanes.

6. The method of claim 5 wherein said mixture of alkanes is comprised of about ⅔ branched-chain alkanes and about ⅓ cycloalkanes.

7. The method of claim 1 wherein said non-volatile oil is a vegetable oil.

8. The method of claim 7 wherein said vegetable oil is a refined, edible vegetable oil.

9. The method of claim 8 wherein said vegetable oil is selected from the group consisting of Canola, soybean, safflower, sunflower, corn, cottonseed and olive.

10. The method of claim 9 wherein said vegetable oil is canola oil.

11. The method of claim 1 wherein said alkane is present in the range of from about 20 to about 80% of said mixture and said non-volatile oil is present in the range of from about 80 to about 20% of said mixture.

12. The method of claim 11 wherein said alkane is present at about 40% to about 60% and said non-volatile oil is present in said mixture at about 40% to about 60%.

13. The method of claim 12 wherein said alkane and said non-volatile oil are present in substantially the same amounts.

14. The method of claim 1 wherein the density of the evaporation inhibitor liquid is not more than about 0.90 g/ml.

15. The method of claim 14 wherein the density of the evaporation inhibitor liquid is not more than about 0.88 g/ml.

16. The method of claim 1 wherein said mixture additionally comprises a surfactant which is present in an amount sufficient to maximize the contact surface area between the evaporation inhibitor liquid and the aqueous medium.

17. The method of claim 16 wherein said surfactant is a polyoxyethylene ether.

18. The method of claim 17 wherein said surfactant is polyoxyethylene 10 oleyl ether.

19. A method for inhibiting evaporation of an aqueous medium comprising covering the aqueous medium with an evaporation inhibitor liquid comprising from about 40% to about 60% of an alkane selected from the group consisting of octadecane and a mixture of 15 to 20 carbon alkanes having about ⅔ branched-chain alkanes and about ⅓ cycloalkanes and from about 40% to about 60% of a vegetable oil, and a surfactant which is present in an amount sufficient to maximize the contact surface area between the evaporation inhibitor liquid and the aqueous medium.

20. The method of claim 19 wherein said vegetable oil is canola oil.

21. The method of claim 19 wherein said mixture consists essentially of about equal amounts of the alkane and canola oil and contains about 0.1% polyoxyethylene 10 oleyl ether.

* * * * *